United States Patent [19]

Yamamoto

[11] Patent Number: 4,528,769
[45] Date of Patent: Jul. 16, 1985

[54] CASTING HANDLE FOR FISHING ROD
[75] Inventor: Shigeru Yamamoto, Tokyo, Japan
[73] Assignee: Daiwa Seiko Kabushiki Kaisha, Tokyo, Japan
[21] Appl. No.: 578,296
[22] Filed: Feb. 8, 1984

Related U.S. Application Data

[63] Continuation-in-part of Ser. No. 294,700, Aug. 20, 1981, abandoned.

[30] Foreign Application Priority Data

Sep. 5, 1980 [JP] Japan .......................... 55-126310[U]

[51] Int. Cl.³ ............................................. A01K 87/06
[52] U.S. Cl. ...................... 43/22; 411/182; 411/338
[58] Field of Search ................... 43/22, 25; 411/182, 411/338

[56] References Cited

U.S. PATENT DOCUMENTS

| 2,839,863 | 6/1958 | Heffel | 43/22 |
| 2,894,426 | 7/1959 | Rapata | 411/338 |
| 3,080,673 | 3/1963 | Smith | 43/22 |
| 3,701,373 | 10/1972 | Wronke et al. | 411/182 |
| 4,040,463 | 8/1977 | Petrus | 411/182 |

Primary Examiner—Nicholas P. Godici
Assistant Examiner—C. McKee

[57] ABSTRACT

Casting handle for a fishing rod characterized by formation of slip-proof flanges at the tip of the stem of a hold screw which, together with a hold piece, serves to fasten the reel base to the casting handle body of a fishing rod.

11 Claims, 6 Drawing Figures

CASTING HANDLE FOR FISHING ROD

This application is a continuation-in-part of application Ser. No. 294,700, filed Aug. 20, 1981, now abandoned.

BACKGROUND OF THE INVENTION

A casting handle for a fishing rod has been known which employs a screw connection of a hold screw and a hold piece as a means for fastening a reel base to a casting handle body of the fishing rod. In this well-known casting handle, however, the hold screw is liable to slip out from the casting handle when the screw connection of the hold screw and the hold piece gets loosened. To eliminate this drawback of prior art, an invention has been proposed. This invention, which has been accomplished to prevent the hold screw from slipping out from the casting handle body, is designated as "reel-hold piece for off-set handle" (Japanese patent application No. SHO 46-109368), but it leaves room for improvement.

In said prior art, the hold screw is a male screw, and a female screw to match the male screw is formed in the hold piece; a neck is provided on the hold screw; and said neck is mounted with an E-stop ring to prevent the hold screw from slipping out from the casting handle body. This art too has a number of drawbacks. For instance, since said E-stop ring has to be installed hidden behind the hold piece, that is, between the hold piece and the casting handle body, the assembling work is difficult to perform. When the hold piece and the hold screw have to be disconnected, the worker has first to apply a screw driver or the like between the hold piece and the casting handle body to remove the E-stop ring, which is not a simple job. Moreover, said E-stop ring, if it is made of metal, gets rusted through corrosive action of sea water, etc., and then it will cease to function as a slip-proof means.

Furthermore, a rusty E-stop ring will stick to the hold screw and refuse to be dismantled for repair.

SUMMARY OF THE INVENTION

The first object of the present invention is to provide a casting handle for the fishing rod, characterized in that it permits easy installation of a hold screw and a hold piece to the casting handle body.

The second object of the present invention is to provide a casting handle for the fishing rod characterized in that connection of said hold screw and said hold piece can be done or undone readily without use of any specific tool like a screw driver, at assembling time and when dismantling is needed thereafter.

The third object of the present invention is to provide a casting handle for the fishing rod characterized in that it comprises a reduced number of parts.

The other objects of the invention will become apparent from the following detailed description.

DETAILED DESCRIPTION OF THE PREFERRED EMBODIMENT

Figure 1:
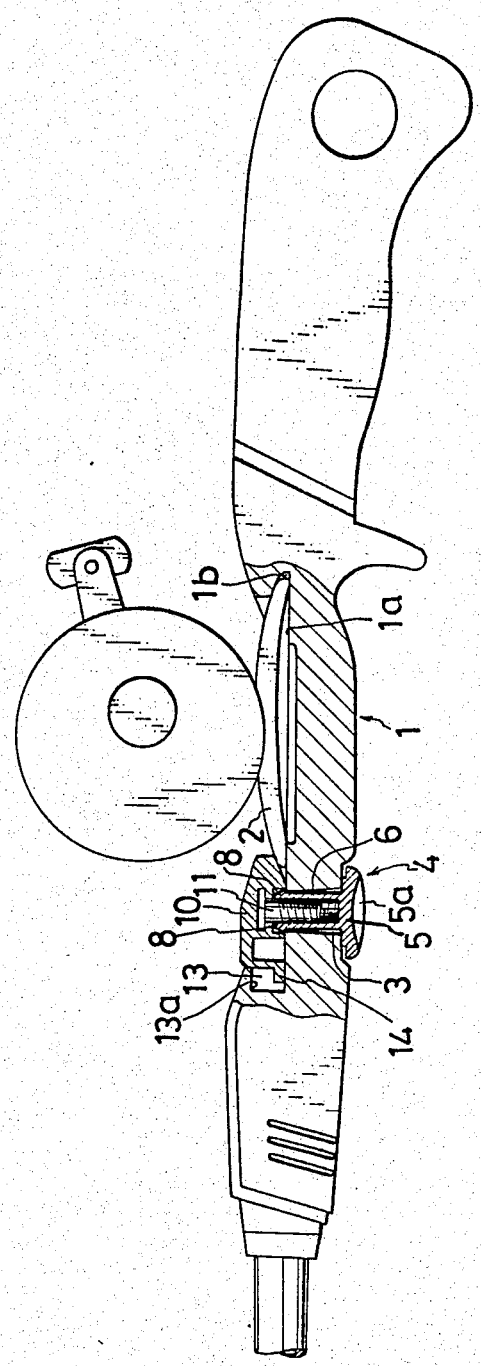
FIG. 1 is a side view of the casting handle showing its details in section.
Figure 2:
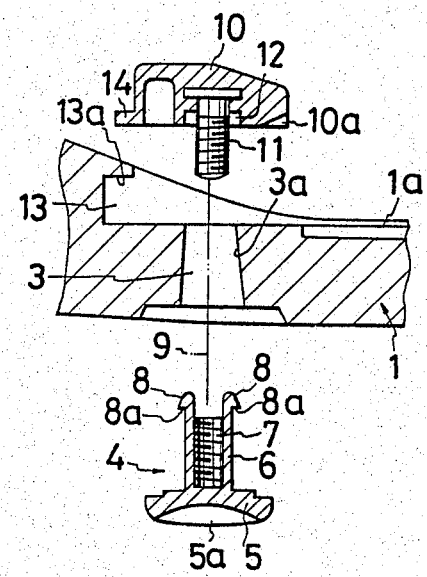
FIG. 2 is a view partially showing the casting handle with its hold screw and its hold piece disconnected.

In FIGS. 1 and 2, 1 is a casting handle body. At the top of said casting handle body 1 there is formed a fitting surface 1a for a reel base 2. A through hole 3 of circular section is bored in said casting handle body 1. Said through hole 3 is here a taper hole.

Namely, said through hole 3 is formed such that its bore diminishes from bottom toward top of the casting handle body 1.

Such taper hole formation in the through hole 3 is favorable for facilitating the insertion of the hold screw 4. It is allowable, however, to form said through hole 3 such that its diameter, wherever measured, may be the same. Said hold screw 4 is fabricated of synthetic resin and it comprises a head 5 and a stem 6. The head 5 has a segmental notch 5a cut thereon so that the hold screw 4 can be turned using a coin or the like.

On the internal wall of the stem 6 is constituted a female screw 7. The outer diameter of the stem 6 is approximately equal to the top bore of the through hole 3. At the tip of the stem 6 is provided a pair of slip-proof flanges 8.

Figure 3:
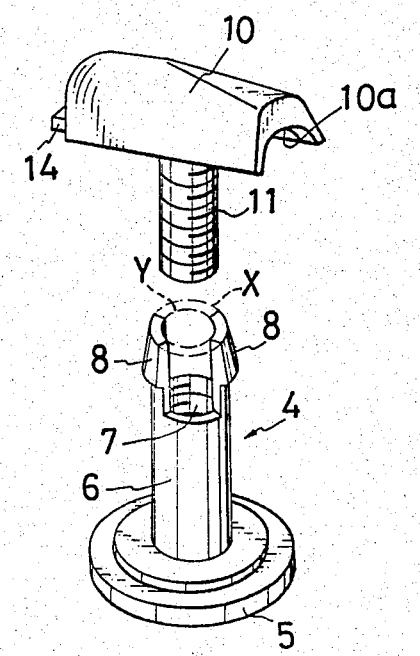
FIG. 3 is a view showing the appearance of said hold screw and said hold piece.

The base 8a of said pair of flanges 8 protrudes outward in the radial direction from the stem 6. Said pair of flanges 8 are made elastic and deformable; when the stem 6 of the hold screw 4 is put into the through hole 3, said flanges are deflected in the radial direction of the stem by an action of the wall 3a of said hole 3. Consequently, the flanges 8 can pass through the hole 3. Said flanges 8 are desirably set at symmetrical positions to each other, which are bordered by the central axis 9, as shown in FIG. 3. The part of the base 8a of said flanges 8, where it contacts the casting handle body 1, is desirably rounded, which is shown in FIG. 6.

Such a rounding of the base 8a of said flanges 8 will assure that in FIG. 1, when the screw connection is more than half undone and a hold piece 10 is pushed down from the top, the wall action of the through hole 3 develops a force to deflect said flanges 8 in the direction of bringing them close together and thereby the hold screw 4 can be smoothly pulled out of the through hole 3.

Figure 6:
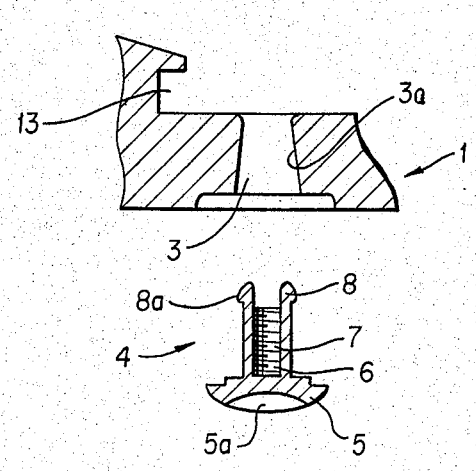
FIG. 6 is a cross section view of a hold screw and a handle body showing round flanges and a round peripheral edge of a through hole.

The same action will be assured by rounding the opening peripheral edge portion of the through hole 3 where it contacts the base 8a of the flanges 8, which is shown in FIG. 6. At the hold piece 10 with a male screw 11, a recess 12 is provided so as to surround this male screw 11. Said recess 12 serves a function to receive said flanges 8. Said flanges 8, as viewed from the top, are desirably arranged such that an outer edge of the tip of one flange and that of the tip of the other flange are located on an imaginary circle X, while an inner edge of the tip of one flange and that of the tip of the other flange are located on an imaginary circle Y.

The casting handle body 1 has a recess 13 formed thereon to receive the boss 14 formed on the hold piece 10. Said boss 14 and said recess 13 cooperate to prevent the hold piece 10 from slipping out from the casting handle body 1. In particular, when the hold screw 4 is not engaged with the hold piece 10, i.e., the stem 6 of the hold screw 4 is not located in the through hole 3, the male screw 11 of the hold piece can be inserted into and removed from the through hole 3. The boss 14, therefore, can be engaged in and disengaged from the recess 13. When the hold screw is located in the through hole 3 and is engaged with the hold piece 10, since the male screw 11 is located in the center of the through hole 3, the boss 14 is securely situated in the recess 13, so that the hold piece 10 can not rotate relative to the handle body 1. When the hold screw 4 is rotated, the hold piece 10 can move in the axial direction of the male screw 11. Meanwhile, the hold piece 10 has a semi-conical recess 10a formed thereon to receive one side of the reel base 2, while the casting handle body 1 has a recess 1b formed thereon to receive the other side of the reel base 2.

Figure 4:
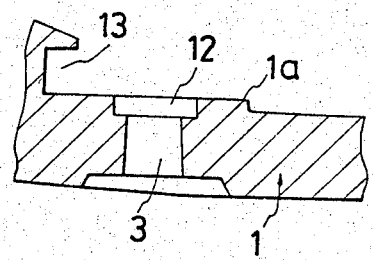
FIG. 4 is a partial, enlarged view of the casting handle body in a different embodiment.

FIG. 4 illustrates a different embodiment of the through hole 3 in the casting handle according to the present invention. In this example, the recess 12 to receive the flanges 8 comes at the top opening of the through hole 3.

Figure 5:
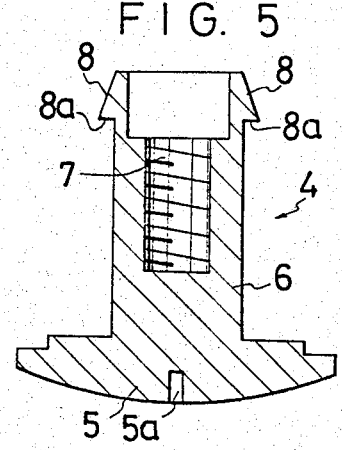
FIG. 5 is an enlarged view showing the structure of said hold screw.

FIG. 5 illustrates a different embodiment of the hold screw in the casting handle according to the present invention. In this example the diameter of the imaginary circle Y edging the flange 8 is made larger than the bore of the stem 6.

Such a constitution is favorable, because the male screw 11 can thereby be prevented from engaging the flange 8.

Next, detachment of the reel base 2 from the casting handle body 1 and attachment of the reel base 2 to the casting handle body 1 are to be described.

FIG. 1 shows a state of the reel base 2 being fitted to the casting handle. When in this state the head 5 is gripped and the hold screw 4 is turned in the direction of undoing the connection of male screw 11 to the female screw 7, the hold piece 10 does not rotate relative to the handle body 1 and is moved in the direction away from the fitting surface 1a of the casting handle body 1, because since the flange 8 is located above the fitting surface 1a, the hold screw 4 simply rotates in the through hole 3. The hold screw 4 does not disengage from the through hole 3.

When the hold piece 10 moves a specific distance, the boss 14 will come to contact the top inside wall 13a of the recess 13, thereby halting farther movement of the hold piece 10. Thus the reel base 2 can be unfitted.

Conversely, when the reel base 2 is to be fitted to the casting handle body 1, the hold screw 4 is turned so that the hold piece 10 is moved to the uppermost position as stated above. Then, one side of the reel base 2 is put into the recess 10a of the hold piece 10 and the other side of it is put into the recess 1b of the casting handle body 1; thereafter the hold screw 4 is turned.

Thereupon, the hold piece 10 will be tightened in the direction of coming close to the casting handle body 1 and thus the reel base 2 will be fitted to the casting handle body 1.

Next, attachment of the hold screw 4 and the hold piece 10 to the casting handle body 1 is to be described.

The male screw 11 of the hold piece 10 is inserted into the through hole 3 and at the same time the boss 14 is inserted into the recess 13 of the casting handle body 1. Then the hold screw 4 is applied from the bottom side of the through hole 3.

Since the bottom side bore of the through hole 3 is made larger than its top side bore, said insertion can take place smoothly. When the hold screw 4 is inserted and turned, the flange 8 comes to engage the through hole 3, more specifically, the wall 3a thereof. Thereafter, the hold screw 4 is further turned, so that the flanges 8 will deflect in the radial direction of the stem 6. Upon further insertion of the hold screw 4, the flanges 8 will pass through the small bore of the through hole 3 and, expanding themselves in the direction away from each other, will restore their original form. In this manner the hold screw 4 engages the casting handle body 1 and the tip of the male screw 11 goes into the stem 6 of the hold screw 4. Thus the hold screw 4 and the hold piece 10 come to be supported on the casting handle body 1.

Once the flanges 8 pass through the through hole 3, if the hold screw 4 is turned to loosen the male screw 11, the hold screw 4 remains in the through hole 3 and the male screw 11 moves upwardly. The flanges 8 operate to keep the hold screw 4 in the through hole 3.

Next, detachment of the hold screw 4 and the hold piece 10 from the casting handle body 1 is to be described.

The hold screw 4 is turned in the direction of undoing the connection between the male screw 11 and the female screw 7. If then the boss 14 of the hold piece 10 is in a position to contact the top inside wall 13a of the recess 13, the tip of the male screw 11 of the hold piece 10 is in a state that the male screw 11 still engages the stem 6 of the hold screw 4 and the hold screw 4 has its flanges 8 engaging the opening peripheral edge portion at the top side of the through hole wall in the casting handle body 1, thereby preventing a slip-out of the hold screw 4. In this state the hold piece 10 is pushed down from the top, whereby a force will act on the hold screw 4 in the axial direction of the stem 6 and thereby the flanges 8 will be radially deflected. The hold screw 4 is forced out of the through hole 3.

According to the present invention, without help of any special tool like a screw driver, the hold piece 10 and the hold screw 4 can thus be readily attached to, and if necessary as readily detached from, the casting handle body 1. And since the engagement of the flanges 8 to the opening peripheral edge portion of the through hole 3 prevents a slip-out of the hold screw 4 from the casting handle body 1 even when the connection between the male screw and the female screw is loosened for changing the reel, there is no possibility of the hold piece being lost and the fishing inadvertently discontinued, which is a practical benefit to the anglers.

What is claimed is:

1. Casting handle for a fishing rod comprising,
a casting handle body adapted to receive a reel base thereon, said casting handle body including a fitting surface for the reel base, a through hole adjacent to the fitting surface, said through hole crossing the plane of the fitting surface and passing through the casting handle body, and blocking means situated adjacent to the fitting surface,
a hold piece including a holding head, and a male screw extending from the holding head and adapted to be inserted into the through hole, said male screw having a diameter smaller than the diameter of the through hole so that when the male screw is located in the center of the through hole, an annular space is formed inside the through hole, the male screw being insertable into the through hole to thereby situate the holding head adjacent to the blocking means of the casting handle body, and when the male screw is located in the center of the through hole, the holding head being prevented from rotating by the blocking means, the holding head, when immovably situated on the casting handle body, holding the reel base on the fitting surface, and a hold screw including a screw head and a cylindrical stem extending from the screw head, said stem having a female screw inside the stem for threadably engaging the male screw of the hold piece and a plurality of flanges at the end portion opposite the screw head, said flanges being curved and spaced apart from one another by means of slits, radius of curvature of the curved flanges being greater than that of the stem, each curved flange having a top portion at the end of the stem and a base portion protruding radially outwardly from the outer periphery of the stem and extending radially inwardly toward the top portion thereof, said cylindrical stem being made of an elastic and deformable material and having an outer diameter substantially the same as the diameter of the through hole so that when the stem is screwed onto the male screw of the hold piece situated in the center of the through hole, the flanges deflect inwardly and pass through the annular space inside the through hole and rest around the edge portion of the through hole, when the hold screw is turned, the hold piece moving close to and away from the fitting surface in a range limited by the blocking means to facilitate change of the reel, and when the hold piece situated away from the fitting surface is strongly pushed downwardly, the hold screw being removed from the through hole to thereby disassemble the hold screw and the hold piece from the casting handle body.

2. Casting handle for a fishing rod according to claim 1, in which said blocking means of the casting handle body is a recess formed on the casting handle body, and said holding head of the hold piece further includes a boss extending from the holding head, said boss being engaged with the recess to prevent rotation and upward movement of the hold piece when the hold piece, hold screw and casting handle body are assembled together and the hold screw is rotated relative to the hold piece.

3. Casting handle for a fishing rod according to claim 1, in which said through hole of the casting handle body is a circular hole tapered toward the fitting surface of the casting handle body.

4. Casting handle for a fishing rod according to claim 3, in which the inner diameter of the cylindrical stem is slightly larger than the outer diameter of the male screw of the hold piece so that when the flanges of the stem of the hold screw pass through the through hole, the flanges slightly deflect inwardly toward the male screw, whereby the flanges pass through the through hole.

5. Casting handle for a fishing rod according to claim 1, in which said hold piece further includes an annular recess on the holding head around the male screw for receiving therein the flanges of the cylindrical stem when the hold screw passes through the through hole and engages the hold piece.

6. Casting handle for a fishing rod according to claim 1, in which said casting handle body further includes an annular recess around the through hole for receiving therein the flanges of the cylindrical stem when the hold screw passes through the through hole and engages the hold piece.

7. Casting handle for a fishing rod according to claim 1, in which the edge of the base portion of each flange is curved so that the hold screw can be easily removed from the through hole when the hold piece situated away from the fitting surface is strongly pushed downwardly.

8. Casting handle for a fishing rod according to claim 1, in which the edge of the through hole adjacent to the fitting surface is curved so that the hold screw can be easily removed from the through hole when the hold piece situated away from the fitting surface is strongly pushed downwardly.

9. Casting handle for a fishing rod according to claim 1, in which the flanges of the hold screw number at least two and are symmetrically arranged on the stem relative to the central axis thereof.

10. Casting handle for a fishing rod according to claim 9, in which outer edges of the ends of the flanges are located on an imaginary outer circle, and inner edges of the ends of the flanges are located on an imaginary inner circle.

11. Casting handle for a fishing rod according to claim 10, in which the diameter of the inner circle is larger than the diameter of the female screw inside the stem to form an inner space therebetween, so that when the hold screw engages the hold piece and passes through the through hole, the flanges slightly deflect inwardly.

* * * * *